US006873597B1

(12) United States Patent
King

(10) Patent No.: US 6,873,597 B1
(45) Date of Patent: Mar. 29, 2005

(54) REDUCED DATA RATE COMMUNICATION SYSTEM

(75) Inventor: Nigel J R King, South Brent (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/371,983

(22) Filed: Aug. 11, 1999

(51) Int. Cl.[7] .............................. H04L 12/26; H04J 3/18
(52) U.S. Cl. ....................... 370/235; 370/310; 370/437; 370/477; 455/450
(58) Field of Search ................................ 370/237, 468, 370/477, 437, 235, 310, 252, 465, 452, 337, 326, 335, 336; 455/450, 445, 200, 1, 206, 451, 452; 709/104, 105, 100, 226, 109, 136, 137, 138, 163, 164; 379/338, 339, 387.01; 375/240–241, 242–254

(56) References Cited

U.S. PATENT DOCUMENTS

| | | | | |
|---|---|---|---|---|
| 5,504,939 A | * | 4/1996 | Mayrand et al. | 455/450 |
| 5,598,416 A | * | 1/1997 | Yamada et al. | 370/335 |
| 5,649,299 A | * | 7/1997 | Battin et al. | 370/311 |
| 5,701,292 A | * | 12/1997 | Chiussi et al. | 370/232 |
| 5,857,147 A | * | 1/1999 | Gardner et al. | 455/67.11 |
| 5,953,346 A | * | 9/1999 | Luddy | 370/465 |
| 6,240,079 B1 | * | 5/2001 | Hamalainen et al. | 370/337 |
| 6,314,112 B1 | * | 11/2001 | Hsu et al. | 370/477 |
| 6,347,091 B1 | * | 2/2002 | Wallentin et al. | 370/235 |
| 6,374,112 B1 | * | 4/2002 | Widegren et al. | 370/352 |
| 6,400,723 B1 | * | 6/2002 | Burg et al. | 370/412 |
| 6,407,993 B1 | * | 6/2002 | Moulsley | 370/332 |
| 6,421,527 B1 | * | 7/2002 | DeMartin et al. | 455/67.3 |
| 6,463,044 B1 | * | 10/2002 | Seo | 370/329 |
| 6,501,736 B1 | * | 12/2002 | Smolik et al. | 370/252 |

FOREIGN PATENT DOCUMENTS

| | | |
|---|---|---|
| EP | 0 668 669 A1 | 8/1995 |
| EP | 0 782 302 A2 | 7/1997 |
| WO | WO 95/12257 | 5/1995 |
| WO | WO 96/10305 | 4/1996 |

* cited by examiner

*Primary Examiner*—Afsar Qureshi
(74) *Attorney, Agent, or Firm*—Barnes & Thornburg

(57) ABSTRACT

A reduced data rate communication system, such as for example a fixed wireless access system, comprises a plurality of user stations each capable of communicating with a common base station. The user stations can make voice or data calls. The data rate available during a data call is controlled in accordance with the bandwidth or channel capacity whilst still allowing access to the required number of users. The data rate may be reduced prior to or during the data call.

16 Claims, 4 Drawing Sheets

REDUCED DATA RATE COMMUNICATION SYSTEM

FIELD OF THE INVENTION

This invention relates to a reduced data rate communication system, to a method of controlling such a system, and to apparatus for use in such a system.

BACKGROUND TO THE INVENTION

In a typical fixed wireless access system each subscriber is provided with a subscriber transceiver system which is located at the subscriber's premises and which is in radio communication with a radio base station which it shares with other subscribers in the locality. In the Nortel Fixed Wireless Access (FWA) system, the transmit and receive bands between the subscriber transceiver systems and the base station are in the 3.5 GHz region. Typically the system may utilise one or more base stations arranged on a cellular frequency re-use planning basis, and the base stations may be connected to the local exchange by a standard 2 Mbit/s G703 link using the V5.2 or other concentrating interface standards. However it will be appreciated that other systems may be used, for example channel-associated signalling (CAS) systems.

The number of subscribers per base station can range from typically up to 75 in a sparsely populated rural area to around 3000 in a densely populated urban area, depending on how many transceivers are provided at the base station. In a typical tri-sector arrangement, each sector is capable of providing sixty voice calls or thirty data calls. The voice calls may be coded using a 32 kbit/s ADPCM (Adaptive Differential Pulse Code Modulation) coding scheme, whereas the data may be coded using a 64 kbit/s PCM A-Law or $\mu$-law coding scheme. This is found to give excellent voice quality and data transfer at very acceptable rates.

However, with the phenomenal increase in the use of data services and internet applications such as web browsing, the typical usage of the line by the subscriber has changed enormously. Originally telephone lines and communications links with local exchanges (central offices) were primarily designed to handle voice traffic of relatively short holding times typically of an average of about three minutes. An internet call consists of data traffic and a typical holding time can be about thirty minutes or considerably longer. This can create a problem in fixed wireless access systems and indeed other more conventional telephone networks, both because of the extended length of these calls and due to the fact that they can effectively occupy two potential voice lines, and so there is a real likelihood of blocking at peak times. Also, many Internet service providers have a point of presence at the local exchange and so these extended calls are charged at local rate only.

OBJECT OF THE INVENTION

The invention seeks to provide a system which can service a reasonable number of subscribers making voice and data calls and which distributes the channel capacity to reduce the possibility of blocking.

SUMMARY OF THE INVENTION

Accordingly, in one aspect, this invention provides a communication system comprising a plurality of user stations each capable of communicating via a respective user channel with a base station having a limited data traffic capacity, each user channel having associated therewith coding means operable for encoding data at a plurality of different pre-set data rates, said system further including monitoring means for monitoring the amount of data traffic at said base station and for causing one or more of said coding means to operate at a reduced data rate if the amount of data traffic at said base station exceeds a predetermined level, thereby to increase the number of user channels available.

Preferably, said monitoring means is operable to cause said coding means to operate at the same data rates in the uplink and downlink directions.

Preferably said coding means at said user station and the corresponding coding means at said base station are each capable of operating at a plurality of different data rates, and said monitoring means is operable to switch both of said coding means to a particular coding data rate.

The system preferably includes respective coding means for the uplink and downlink directions, and said monitoring means is preferably operable to control the coding data rates in both the uplink and downlink directions.

The monitoring means may be operable to control the coding means to apply different coding data rates in the uplink and downlink directions.

Where the modems at each end are capable of re-training during a call, said monitoring means is preferably operable to cause said coding means to change the coding data rate during a call if the data transfer at said base station exceeds a predetermined level.

In another aspect, this invention provides a fixed wireless access system comprising a plurality of user stations capable of communicating via respective user radio channels with a base station having a limited data traffic capacity, coding means operable for encoding data at a plurality of different pre-set data rates, said system further including monitoring means for monitoring the amount of data traffic at said base station and for causing said coding means to reduce the data rate if the amount of data traffic at said base station exceeds a predetermined level, thereby to increase the number of user channels available.

In yet another aspect, this invention provides a method of controlling a communication system comprising a plurality of user stations capable of communicating via respective channels with a base station having a limited data traffic capacity, each user channel having associated therewith coding means operable for encoding data at a plurality of different coding rates, which method comprises monitoring the amount of data traffic at said base station and reducing the data coding rate if the amount of data traffic at said base station exceeds a predetermined level, thereby to increase the number of user channels available.

The coding rates in the uplink and downlink directions may be the same or different.

Whilst the invention has been described above, it extends to any inventive combination or sub-combination of the features set out above or in the following description.

BRIEF DESCRIPTION OF THE DRAWINGS

The invention may be performed in various ways, and an embodiment thereof will now be described, by way of example only, reference being made to the accompanying drawings, in which.

Figure 1:
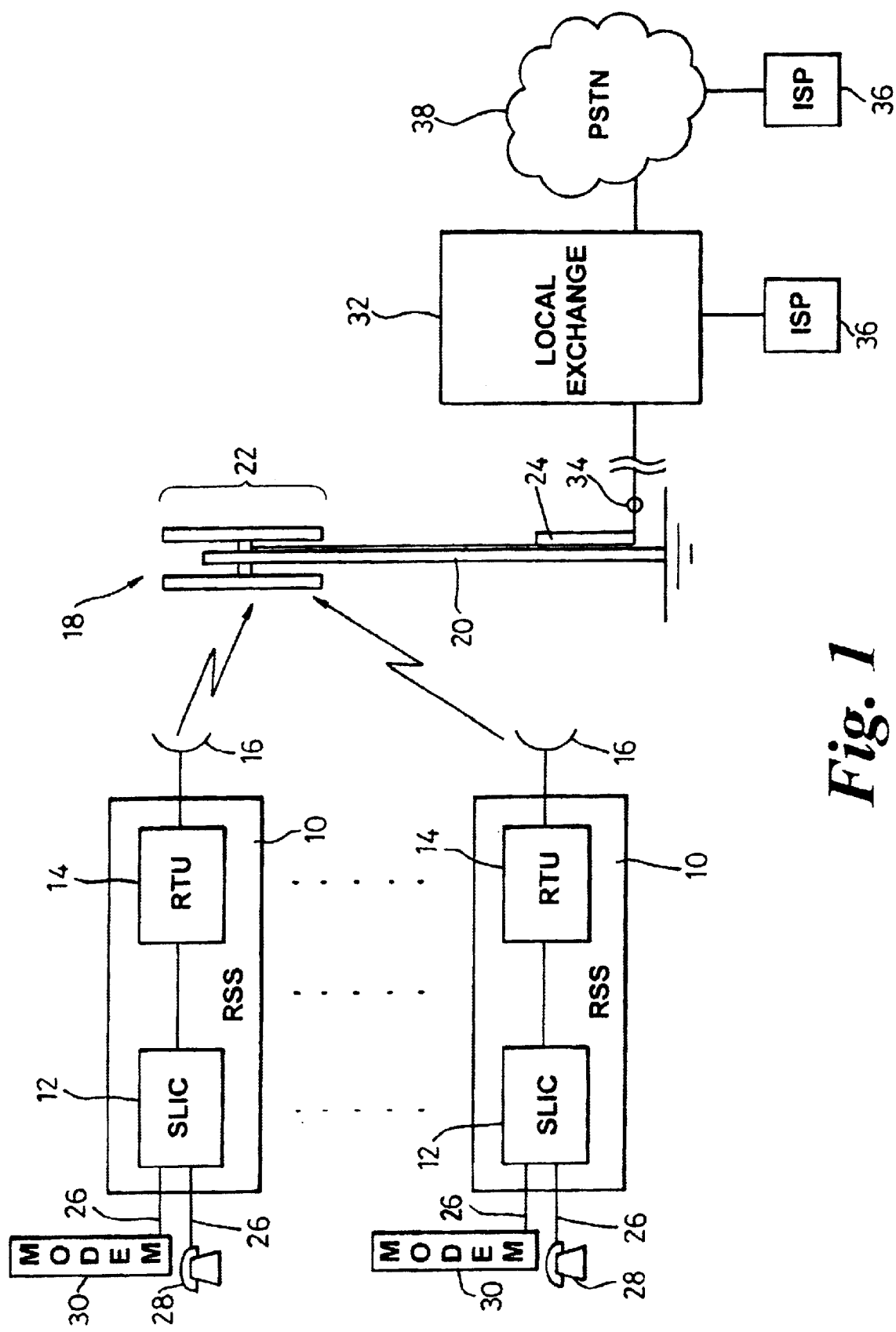
FIG. 1 is a schematic diagram of a fixed wireless access telephone system incorporating a reduced data rate in accordance with this invention.

Referring initially to FIG. 1, the illustrated embodiment of fixed wireless access system comprises a plurality of residential service systems 10 installed at respective subscriber premises. The residential service systems 10 incorporate a subscriber line interface card 12 and a residential transceiver unit 14. The residential transceiver unit 14 may be externally mounted and includes an integral antenna 16 in a near line of sight with an integrated base station 18. The external antenna 16 is preferably directional and aligned towards the integrated base station 18. The integrated base station 18 comprises a mast 20, a unidirectional antenna arrangement 22, and a transceiver microwave unit 24.

Figure 2:
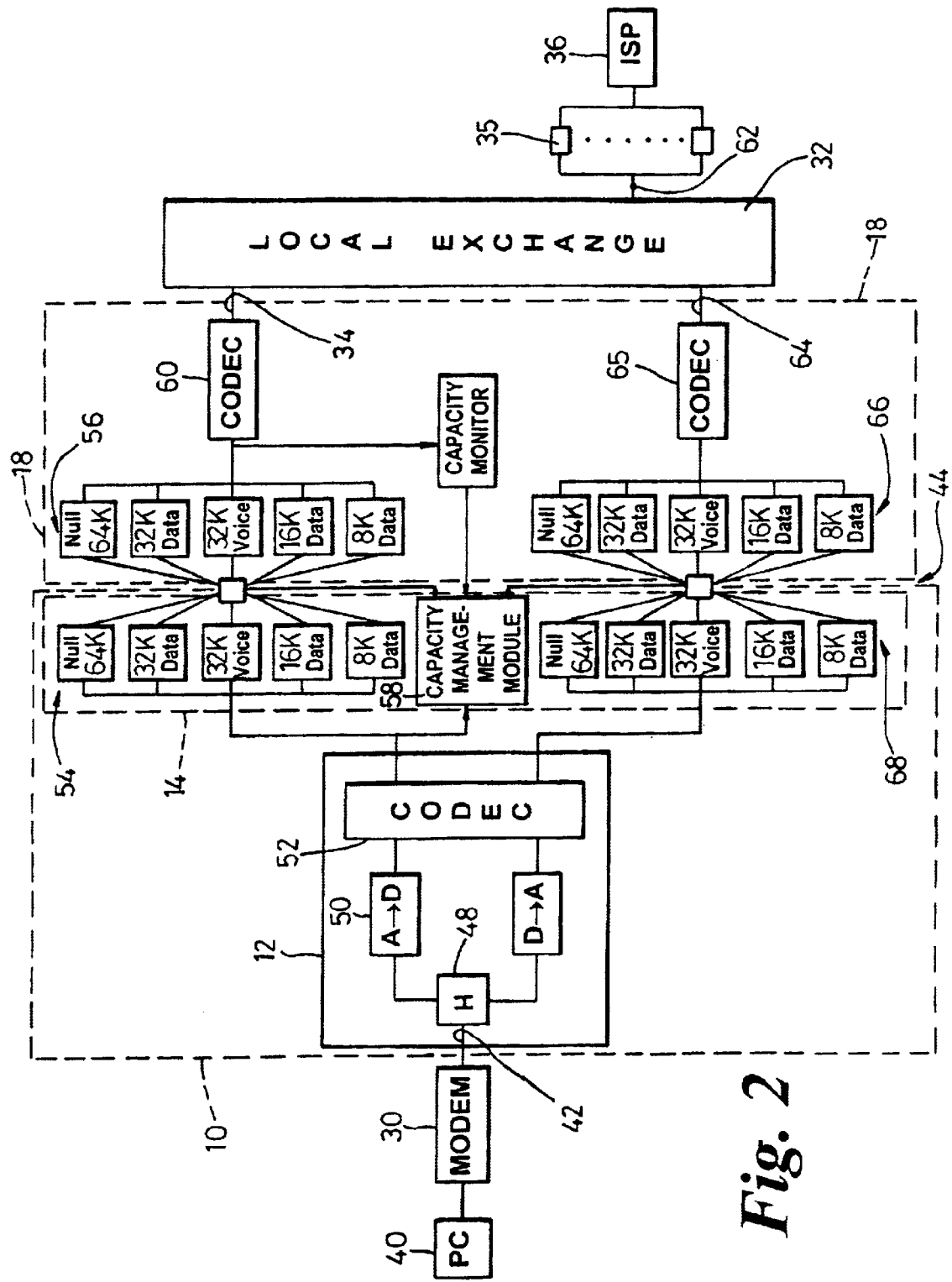
FIG. 2 is a more detailed schematic diagram of the system of FIG. 1 showing data transfer from a subscriber's modem, via the fixed wireless access system and the PSTN switch to the modem of an internet service provider.

The subscriber line interface card 12 provides the subscriber with two analogue telephone lines 26 and incorporates a linear codec (see FIG. 2). Standard subscriber equipment may be connected to the subscriber line interface card 12, such as for example a voice handset 28, a modem 30, a fax machine (not shown). The base station 18 transmits and receives data across respective radio links with a plurality of residential service systems 10 in the locality it serves, and is connected to the local exchange 32 by a backhaul such as a land line 34 or a microwave link. Internet service providers (ISPs) 36 may have a point of presence at the local exchange or they may be accessed via the PSTN or other network 38.

In this particular implementation, for voice, the CCITT G721 32 kbit/s ADPCM (Adaptive Differential Pulse Code Modulation) coding standard is used to provide high quality speech. When data tones are detected in the voice band, the coding scheme is changed automatically to provide a 64 kbit/s PCM coded channel, thereby making the system fully transparent to all PSTN voiceband data modems.

Referring now to the more detailed schematic diagram shown in FIG. 2, in this embodiment of fixed wireless access system, a subscriber connects his computer 40 to the residential service system 10 via a modem 30 and an analogue line 42. The residential service system 10 converts the analogue signal from the modem 30 into a digital signal which is then modulated onto a carrier by the residential transceiver unit 14 and transmitted across the air interface 44 to the base station 18. The residential transceiver unit 14 includes a capacity management module 58 which includes modem detect circuitry and determines an appropriate PCM coding scheme (as to be described below), applies this and also notifies the base station 18 of the PCM coding scheme adopted, so that the codec functions at the residential transceiver unit 14 and at the base station 18 are switched as a pair, in both the uplink and downlink directions. One method of distinguishing a modem call from a voice call is to detect the initial data tone, e.g. the 2.1 KHz tone (ANS) or (ANSam) tone. The coding scheme adopted by the residential transceiver unit and the base station is configured to provide the appropriate PCM coding. The base station 18 processes the signal for onward transmission to the local exchange 32, along a PCM 30 backhaul 34. The signal is transmitted via the local exchange 32 to the other party which here is shown as a modem 35 in the the modem pool of an Internet Service Provider (ISP) 36 which here is assumed to have digital access to the local exchange 32, although as shown in FIG. 1, the ISP 36 may instead be located away from the local exchange and connected thereto by the PSTN 38. The other party could also be another home subscriber with a modem connected digitally, apart from the final analogue loop.

Both the subscriber modem 30 and the server modem 35 incorporate processors to effect the necessary protocols, modulation and demodulation of the signals and to probe the line from time to time to establish the maximum available data transfer rate. Each modem also includes a digital pad attenuator for inserting attenuation as required into the call to adjust the level of the call as appropriate for the quality of the link.

Referring now in more detail to the data flow in the above arrangement, data from the PC 40 passes in digital format to the modem 30 typically along an RS232 connection. The modem then converts the digital data signals into corresponding analogue signals for transmission over the analogue telephone line. The analogue telephone signal is passed to the subscriber line interface card 12 of the residential service system 10. At the subscriber interface 12 the uplink signal passes via a hybrid 48 to an analogue to digital converter 50 and thence to a linear codec 52 where it is coded and passed to the residential transceiver unit 14 at 64 kbit/s. At the residential transceiver unit it is modulated by a codec 54 according to a coding scheme to be described below and then transmitted across the air interface 44 to the base transmitter station 18. At the base transmitter station 18 the signal is supplied to a codec 56 providing a variety of coding schemes equivalent to those at the residential transceiver unit 14. For example, as shown, the residential transceiver unit 14 and the base station 18 may be capable of providing coding schemes such as a null scheme 64 kbit/s PCM (data type) 32 kbit/s PCM (data type) 32 kbit/s (voice type) 16 kbit/s PCM (data type) 8 kbit/s PCM (data type) etc. In the uplink path, the codecs 54, 56 in the residential transceiver unit 14 and at the base station 18 are switched as a pair under the control of the capacity management module 58 which monitors the data bandwidth available and/or the numbers of free channels available and, for data calls, implements a reduced rate coding scheme on data calls if the number of free channels available falls below a pre-set threshold. Thus, provided there is plenty of capacity available, the residential transceiver unit and the base station codecs 54, 56 will be switched by the capacity management module to provide 64 kbit/s data rate (null coding). However, as the number of subscriber channels in use at any one time increases to above the preset threshold, the capacity management module 58 implements a progressively reduced rate coding scheme such as 32 kbit/s, 16 kbit/s, 8 kbit/s (voice/data type) depending on the capacity available.

From the base station 18, the coded signal passes via a linear codec 60 and is transmitted via a standard link (e.g. PCM 30) to the local exchange 22 and thence via a digital line such as an E1 line 62 to the modem 35 in the modem pool of the ISP 36.

The downlink data route is similar, but recent standards have allowed asymmetric data rates in the uplink and downlink directions, achieving this by direct control of the PCM data lines at the exchange. In addition, it has recently become possible to increase the data rate in the downlink direction by schemes such as K56 flex, X2 and others. It will of course be appreciated that the flexible data rate scheme described here may be used in conjunction with these recent improvements. In the downlink route, the data passes from the ISP modem via the E1 line 62 to the local exchange 32 and via a standard link 64 to the base station 18.

At the base station 18, the signal is modulated by a linear codec 65 and then, as with the uplink direction, one of a number of predetermined coding schemes is implemented by the base station downlink codec 66. The signal is then transmitted across the air interface 44 to the residential transceiver unit 14 which includes a downlink codec 68 which again is switched as a pair with the base station downlink codec 66 to provide appropriate coding such as 64 kbit/s data, 32 kbit/s voice, 32 kbit/s data, 16 kbit/s data, 8 kbit/s data etc. As before the codecs 66 and 68 are switched as a pair by the capcity management module 58. From the residential transceiver unit 14, the signal then passes through the subscriber interface card 12 via the modem 20 to the subscriber's PC 40.

Figure 3:
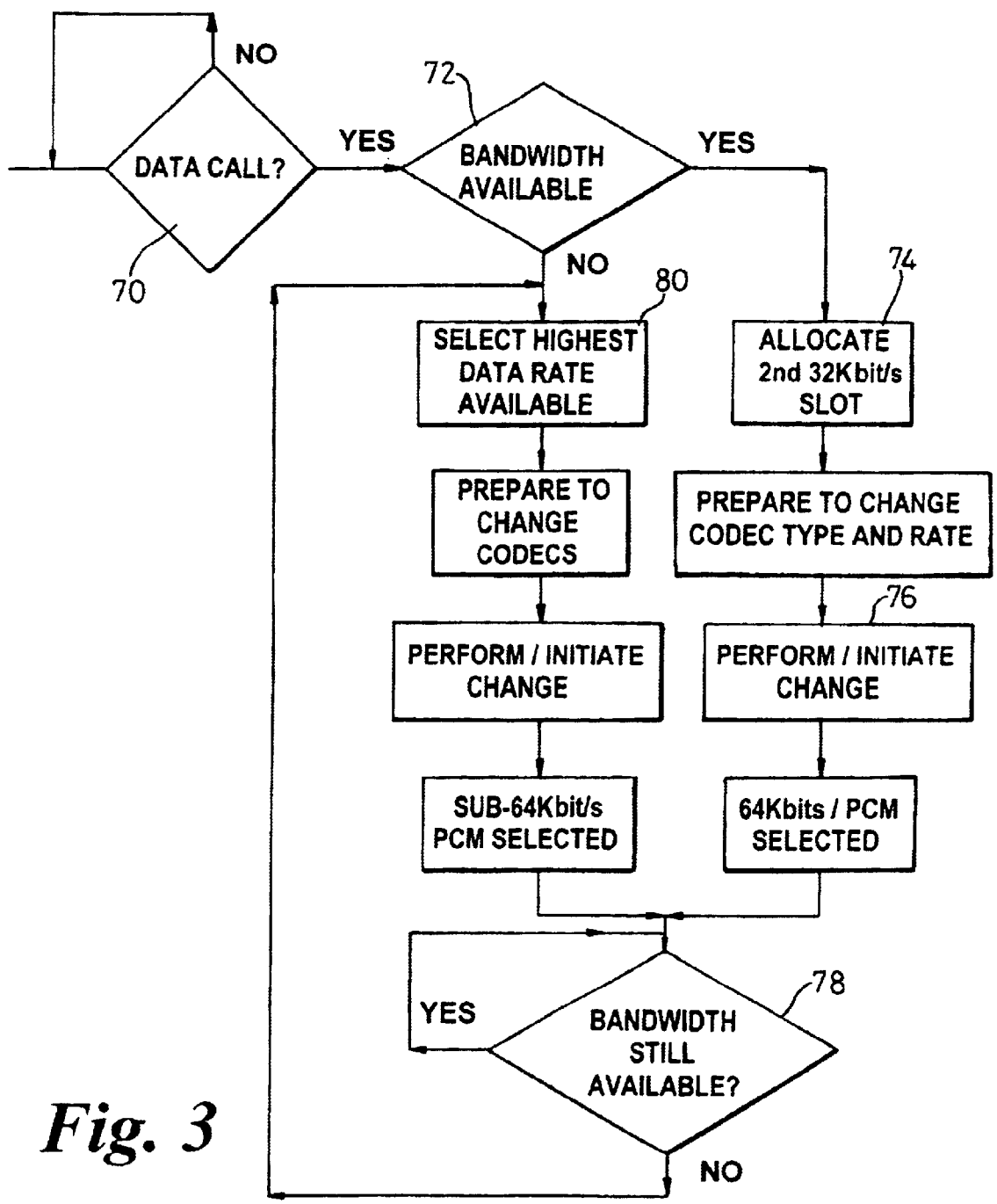
FIG. 3 is a flow chart illustrating operation of the capacity management module incorporated in the embodiments of FIGS. 1 and 2 to select the data rate for a new data call in accordance with channel availability.

Referring now to the flow charts in FIGS. 3 and 4, the capacity management module will be described in more detail. At 70, the incoming calls are monitored or "sniffed" to detect a data call. When a data call is detected the monitor determines at 72 whether the base station has the bandwidth available to allocate another 32 kbit/s channel. If there is sufficient bandwidth available then a second channel is allocated at 74, whereupon the capacity management module prepares to change the type and rate of modulation and thereafter at 76 initiates the change at both the base station and residential base unit codecs 54, 56 so that the highest data rate of 64 kbit/s PCM is selected. The module thereafter continues to monitor capacity and provided there is still sufficient capacity no action is taken.

However, if on detection of a data call, there is insufficient bandwidth available (or if it is determined at 78 that there is no longer sufficient capacity of an existing data call) the capacity management module 58 determines and selects at 80 the highest data rate permissible given the current call capacity and prepares to change the codec type and signals this to the residential transceiver unit 14; The change is then implemented so that the data arrives in a sub-64 kbit/s data channel.

It should be noted that it would also be possible to implement this system without providing the facility of changing the data rate during a data call. Indeed, change of data rate during the call should only be implemented in systems in which the modems are capable of re-training during a call.

Figure 4:
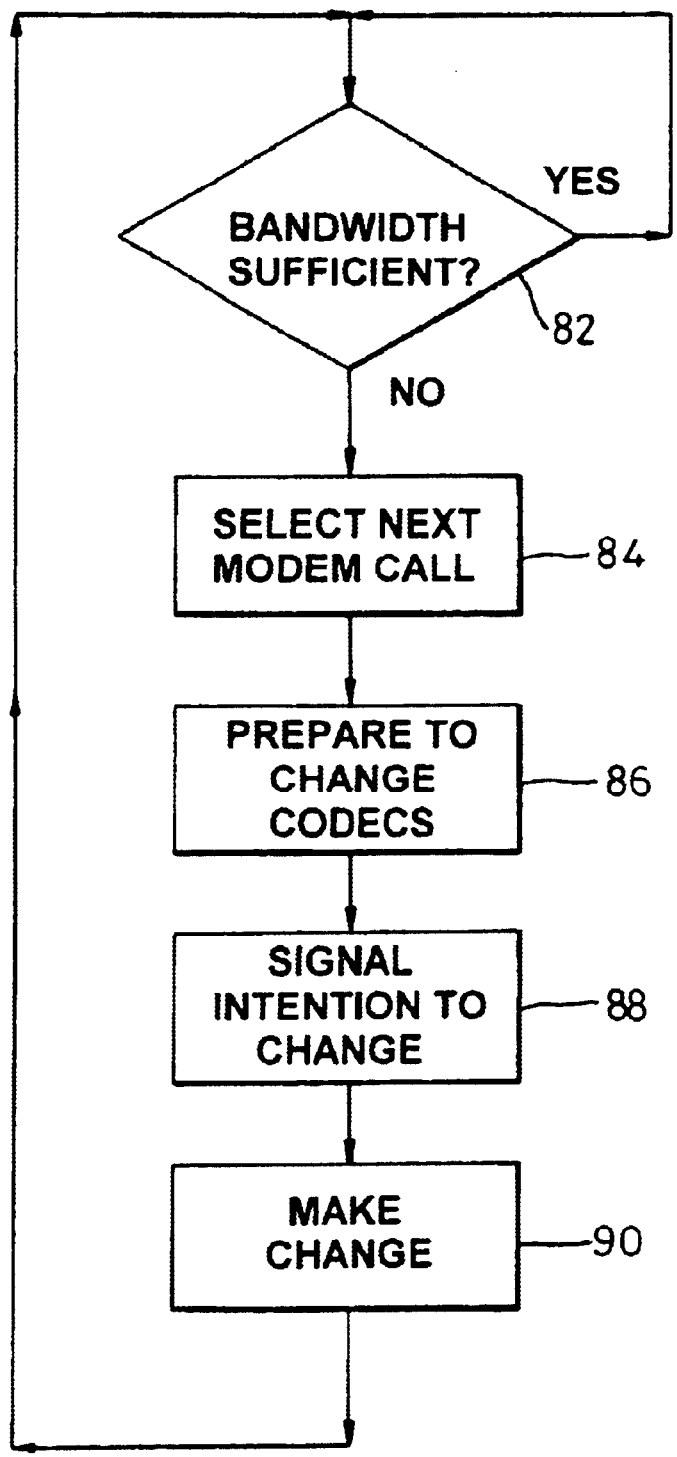
FIG. 4 is a flow chart illustrating operation of the capacity management,module incorporated in the embodiment of FIGS. 1 and 2 to adjust the data rate of existing data calls in progress to increase channel availability.

Referring now to FIG. 4, in this arrangement the capacity management module is capable of tearing down a call in progress when it determines that the system is blocked (or is likely to). Again, this feature will normally require that the modems are capable of retraining.

The management module 58 monitors bandwidth availability at 82 and if there is adequate bandwidth no action is taken. If however there is insufficient bandwidth, the capacity management module prepares to change the codec type at 86 and at 88 signals its intention to the residential transceiver unit 14. It then makes the change at 90 and determines at 82 whether there is now sufficient capacity. If there is still insufficient capacity, the capacity management module selects another modem call at 84 and performs the same routine and repeats this until there is sufficient capacity.

In the above arrangement the capacity management module 58 effectively monitors the number of calls or the channel capacity available and if the number of calls exceeds a pre-set threshold (or the capacity falls below a preset threshold) it selects the best codec function in accordance with the available capacity. As required the data rate is reduced so that, for example, instead of applying 64 kbit/s PCM (8 bits×8 KHz) it applies a lower data rate, e.g. 32 kbit/s PCM (4 bits×32 kbit/s) so that another 32 kbit/s channel is freed. When the coding rate is reduced, the data width decreases accordingly and so not all of the 255/256 quantisation levels are required. In addition, the ISP modem 35 and the subscriber modem 30 need to determine which of the quantisation levels are in use at the lower data rates. Thus at 32 kbit/s the data width is 4 bit and so only 16 of the standard 256 levels by the PSTN are employed. For this purpose when the data rate is changed, the modems 30, 35 train or re-train to maintain the optimum data rate available. The modems then implement via the digital attenuation pads an appropriate mapping which takes account of the reduced number of quantisation levels required and selects those corresponding to the A-Law or $\mu$-Law coding as required by the network.

Various alternative coding schemes are also possible; for example if the data rate is to drop from 64 kbit/s PCM to 32 kbit/s PCM, the information may be conveyed in the four most significant bits, with the four least significant bits not being transmitted.

At the same time as arranging for the reduced data rates, the capacity management module 58 will also reallocate calls to the freed slots to maximise the traffic carried by the base station.

It should also be appreciated that the system could operate on demand, with data yielding to voice calls.

As well as providing reduced data rate to avoid blocking, the system may also be adapted to provide tiered service levels with significantly increased or guaranteed higher data rates for premium customers and/or progressively slower data rates for standard rate subscribers customers and subscribers who are late in paying their bills.

What is claimed is:

1. A communication system comprising:
    a user station capable of communicating with a base station over a limited capacity link, the link comprising a number of fixed bit rate channels for providing a fixed bandwidth voice service between said user station and said base station and a separate variable bit rate data channel for providing a data service between said user station and said base station; and
    a capacity management module for monitoring available bandwidth of said link channels, wherein, if available bandwidth falls below a predetermined threshold, the capacity management module is arranged to implement a reduced bit rate coding scheme for the variable bit rate data channel whilst leaving the fixed bit rate channels unchanged.

2. A communications system according to claim 1, wherein the capacity management module implements the reduced bit rate coding scheme for the variable bit rate data channel in a progressive manner dependent on available bandwidth.

3. A communications system according to claim 2, wherein the fixed bit rate channels each have a bit rate of 32 kb/s, and the bit rate coding scheme for the data channel comprises a bit rate up to one of 64 kb/s, 32 kb/s 16 kb/s and 8 kb/s.

4. A communications system according to claim 1, wherein the capacity management module is arranged to monitor fixed bandwidth transmissions on said number of fixed bit rate channels and, on detection of a data tone in a fixed bandwidth transmission, to switch said number of fixed bit rate channels to a variable bit rate data channel having a maximum bit rate dependent on what portion of said link is allocated to comprise said variable data rate channel.

5. A communications system according to claim 4, wherein the capacity management module is arranged to select a bit rate coding scheme for the variable bit rate data channel on detection of a data tone in a fixed bandwidth transmission and to communicate said selected coding scheme to the base station.

6. A communications system according to claim 4, wherein the capacity management module is arranged, prior to selecting a coding scheme for the variable bit rate channel, to check available bandwidth of said link and, if there is not sufficient available bandwidth to provide a variable bit rate channel having a highest permissible data rate, then the capacity management module selects a bit rate coding scheme for the data channel that is the highest permissible data rate determined from current available bandwidth on said link.

7. A communications system according to claim 1, wherein the capacity management module is arranged to effect the same bit rate coding scheme for the variable bit rate channel in both an uplink direction and a downlink direction.

8. A communications system according to claim 1, wherein the number of fixed bit rate channels are voice band channels.

9. A communications system according to claim 1, wherein said system is a fixed wireless access system (FWA).

10. A method of operating a communications system in which a user station communicates with a base station over a limited capacity link, said method comprising the steps of:

providing a number of fixed bit rate channels between said user station and base stations to provide a fixed bandwidth voice service therebetween;

providing a separate variable bit rate data channel between said user station and base stations to provide a data service therebetween; and providing a capacity management module for monitoring available bandwidth of said link, wherein, if available bandwidth falls below a predetermined threshold, the capacity management module implements a reduced bit rate coding scheme for said variable bit rate data channel whilst leaving the fixed bit rate channels unchanged.

11. A method according to claim 10, wherein the capacity management module implements the reduced bit rate coding scheme for the variable bit rate data channel in a progressive manner dependent on available bandwidth.

12. A method according to claim 11, wherein it includes the step of monitoring fixed bandwidth transmissions on said number of fixed bit rate channels and, on detection of a data tone in a fixed bandwidth transmission, switching said number of fixed bit rate channels to a variable bit rate data channel having a maximum bit rate dependent on what portion of said link is allocated to comprise said variable data rate channel.

13. A method according to claim 12, wherein it includes the step of selecting a bit rate coding scheme for the variable bit rate data channel on detection of a data tone in a fixed bandwidth transmission and communicating said selected coding scheme to the base station.

14. A method according to claim 12, wherein it includes, prior to selecting a coding scheme for the variable bit rate channel, the step of checking available bandwidth of said link and, if there is not sufficient available bandwidth to provide a variable bit rate channel having a highest permissible data rate, then selecting a bit rate coding scheme for the data channel that is the highest permissible data rate determined from current available bandwidth on said link.

15. A method according to claim 10, wherein the same bit rate coding scheme is effected for the variable bit rate channel in both an uplink direction and a downlink direction.

16. A method according to claim 10, wherein the method comprises operating a fixed wireless access (FWA) communications system.

* * * * *